Figure 4:
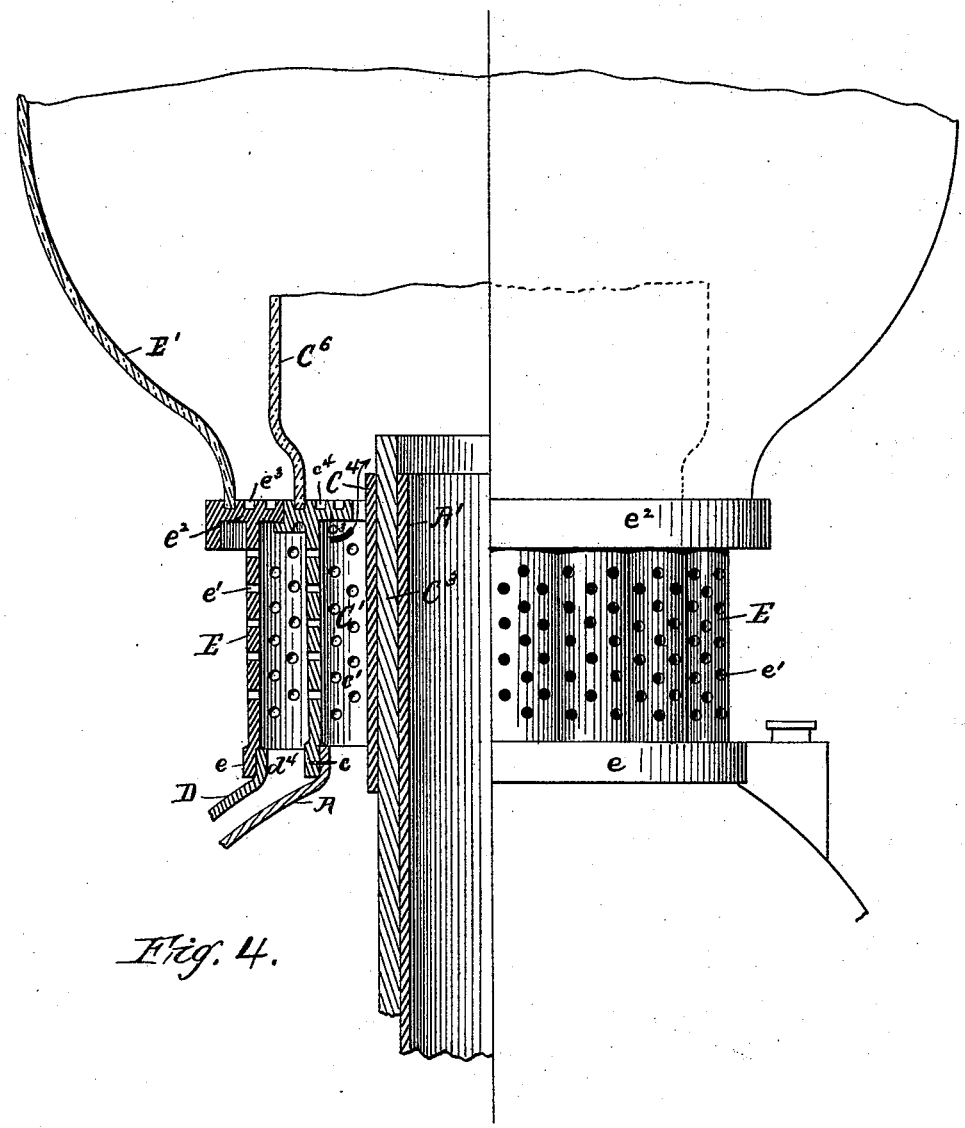

(No Model.) 2 Sheets—Sheet 1.
J. W. WILLIAMS.
LAMP.
No. 396,348. Patented Jan. 15, 1889.
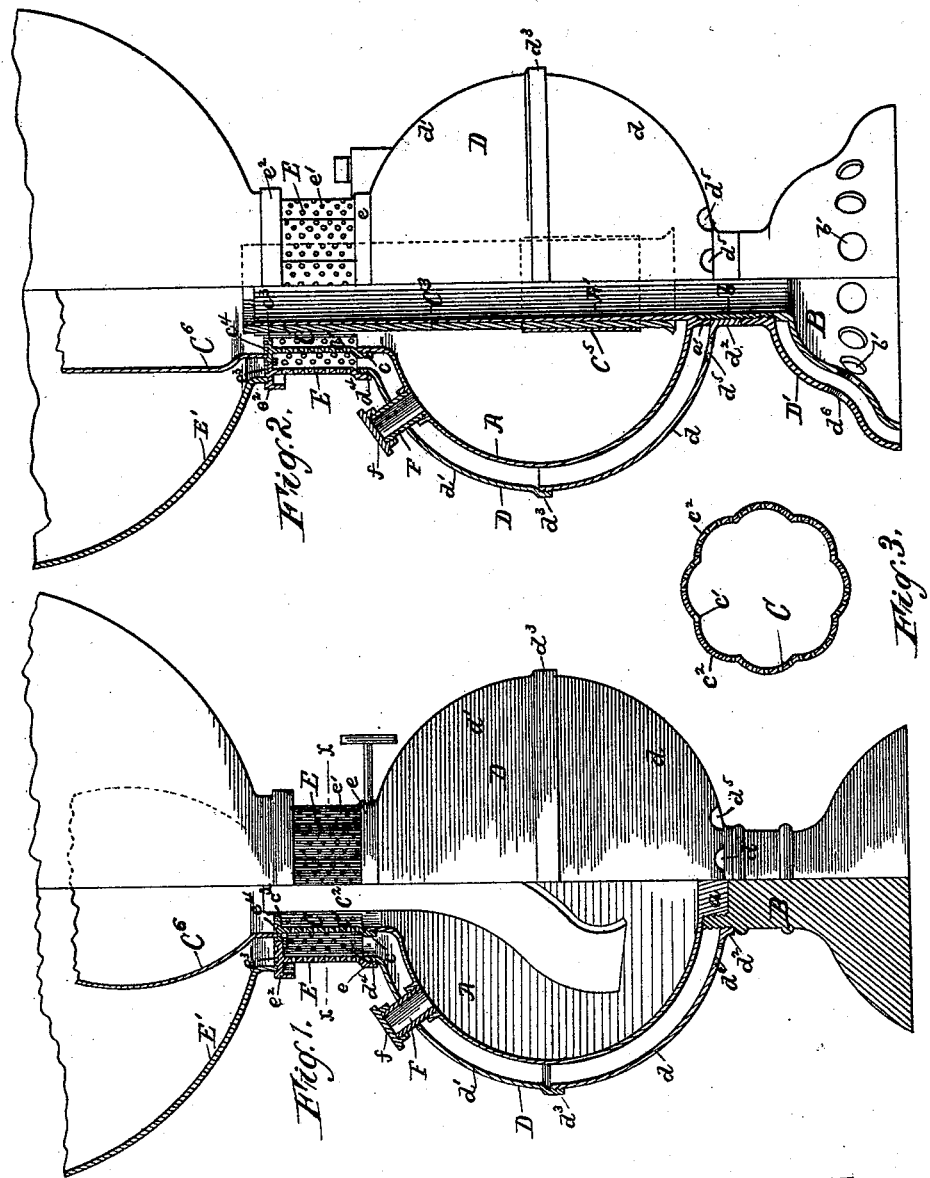
Witnesses.
Inventor:

(No Model.) 2 Sheets—Sheet 2.

J. W. WILLIAMS.
LAMP.

No. 396,348. Patented Jan. 15, 1889.

WITNESSES:

INVENTOR

BY

ATTORNEY

UNITED STATES PATENT OFFICE.

JAMES W. WILLIAMS, OF BROOKLYN, NEW YORK.

LAMP.

SPECIFICATION forming part of Letters Patent No. 396,348, dated January 15, 1889.

Application filed April 20, 1888. Serial No. 271,256. (No model.)

*To all whom it may concern:*

Be it known that I, JAMES W. WILLIAMS, of Brooklyn, county of Kings, State of New York, a citizen of the United States, have invented certain new and useful Improvements in Lamps, of which the following is a full, clear, and exact description, reference being had to the accompanying drawings, forming part of this specification.

My invention consists in a lamp having an oil-reservoir provided with an inclosing-jacket and a burner with a perforated wall, with which is combined a perforated sleeve carried by the jacket and conformable to and surrounding said perforated burner-wall and adapted to fit snugly at its top to the upper edge of said burner-wall, as hereinafter described, and for the purposes hereinafter set forth.

Figure 1 illustrates, partly in vertical elevation and partly in vertical central section, an ordinary flat-wick kerosene-lamp containing the features of my invention. Fig. 2 is a similar view of an Argand or central-draft lamp, showing the features of my invention applied thereto. Fig. 3 is a lateral cross-section of the perforated wall of the burner on the line $x\ x$, Fig. 1. Fig. 4 is an enlarged view in detail of the burner and its devices shown in Fig. 2.

A is the lamp body or reservoir. B is the standard or foot. The standard B is shown solid in Fig. 1 with a threaded recess at its top end, into which a threaded boss, $a$, on the reservoir A is screwed to attach the reservoir to the base B. In Fig. 2 the reservoir A, having the central-draft wick-tube A', is secured to the base B, which is hollow, by means of a threaded annular flange, $a'$, on the reservoir, which screws upon the threaded portion $b$ on the exterior of the standard B, as shown.

In Fig. 1, C is the burner, which screws upon the neck of the reservoir A; and in Fig. 2, C' is the burner, similarly screwed to the neck of the reservoir.

$C^2$ is the ordinary flat wick in the burner C in Fig. 1, and $C^3$ is the round wick in the burner C' in Fig. 2, working on the wick-tube A' thereof.

$C^4$ is the inner wall of the burner, and between which and the wick-tube A' the wick passes, and which I denominate the "outer wick-tube."

$C^5$ is the wick-shifter for raising and lowering the wick, as is usual in lamps of this construction, Fig. 2.

In constructing the burners C and C', I form them each with the cylindrical interiorly-threaded portion or lower rim, $c$, adapted to screw upon the neck of the lamp-reservoir, and with the preferably polysided vertical perforated inclosing-wall $c'$, preferably octagonal, as shown in Fig. 3, with each of the sides more or less outwardly curved, as shown at $c^2$, Fig. 3. This form of the burner-wall $c'$ provides a greater area of perforations for the inflow of air to the wick-flame in the burner, and hence to produce a better and steadier flame than is possible in the ordinary cylindrical burner. The top of each said burner has the horizontal annular plate $c^3$, supported in the usual manner on the perforated wall $c'$, and I form upon the upper face of this plate a series of concentric grooves or channels, $c^4$, which are adapted to receive chimneys of varying size at their base. In the drawings the chimney $C^6$ is shown as fitted to and seated in the outside or largest of these concentric grooves. The inner grooves are adapted to have chimneys of less diameter at their base seated in them.

At D, Figs. 1 and 2, is shown a jacket, which may be of metal, glass, wood, or other material possessing suitable rigidity, and which incloses the body or reservoir A of the lamp, and preferably conforms thereto in outline or shape, and is of such diameter relatively to the lamp-body that when seated thereon there will be a space or chamber between it and the body, as shown. I find it preferable to construct this jacket D in two parts or sections, $d\ d'$, the lower section, $d$, being screwed to the base B by means of a threaded flange, $d^2$, carried by said section, and the upper section, $d'$, being screwed at its rim-flange $d^3$ to the rim of the lower section, $d$, as shown.

In putting the several described parts together, the section $d$ is first screwed to its seat on the base B. Then the reservoir A is seated on the base, as described, and then the section $d'$ of the jacket is screwed to the lower section, $d$. To the neck $d^4$ of the upper section, $d'$, of the jacket is detachably attached the sleeve E, which is adapted in dimensions to surround the burner C or C′, as shown in Figs. 1 and 2, respectively, and preferably to conform in shape to the shape of the burner, as shown. The sleeve E is preferably attached to the neck of the jacket by means of the threaded annular flange $e$, and the body of the sleeve at $e'$, immediately surrounding the perforated wall of the burner, is also perforated, as shown. The sleeve is closed at its top by the annular horizontal flange $e^2$, which may be carried by the sleeve-body, as shown, and which fits at its inner edge to the rim of the top plate, $c^3$, of the burner, as shown. The upper face of said flange $e^2$ is provided with the series of concentric circular grooves $e^3$, whereby the sleeve E is adapted to receive and support globes or shades of varying sizes. In the drawings, E′ represents a globe supported in one of said grooves $e^3$.

The jacket D is provided with the openings or perforations $d^5$, as shown, whereby air is admitted to the space between the jacket and the lamp-body A.

By means of my particular improvement, consisting in the perforated sleeve E, carried by the jacket D and surrounding the perforated burner-wall $c'$, as described, while the wick-flame will be furnished with an augmented air-current through the jacket D, entering at the perforations $d^4$ and passing around the reservoir, and thence to and through the burner-wall $c'$, the air which passes to the said burner-wall through the perforated sleeve E, thereby being strained and steadied as a current, will, in passing through the perforated burner-wall, mingle with the jacket air-current to the burner and serve to steady the entire or combined air-current, so that while the wick-flame is given additional brilliancy it will also have augmented steadiness and evenness, any disturbances in the air external of the lamp not being felt at the burner.

The supplemental air-current through the jacket in connection with the additional air-current through the sleeve E to the burner will in effect give to the flame of an ordinary flat-wick lamp an approximation of the result attained in a central draft or Argand lamp, while when this feature of my invention is applied to a central-draft lamp, as shown in Fig. 2, the jacket air-current will give an increased brilliancy to the flame of the Argand wick.

A jacket, D′, may be applied to the hollow base B of the central-draft lamp, as shown in Fig. 2, the jacket being perforated at $d^6$ coincidently with the perforations $b'$ in the hollow base. This jacket D′ will serve to render the base of the jacketed reservoir of suitable and pleasing relative proportions, and also to assist in steadying the air-current of the central draft.

In connection with the jacket D it will be found preferable to employ the filling-tube F, screwed into a suitable opening in the reservoir, and reaching thence through the jacket D, where it is closed by the usual cap, $f$. This extended tube will be found specially useful in enabling the person filling the reservoir to readily perceive when the reservoir is full without liability of causing it to overflow.

What I claim as my invention, and desire to secure by Letters Patent, is—

1. In a lamp, the combination, with the reservoir A, provided with the described jacket D, and the burner C, with its perforated wall $c'$, surmounted by a flange, $c^3$, having concentric grooves $c^4$, of the perforated sleeve E, carried by said jacket and surrounding said burner and provided with the top flange, $e^2$, adapted to fit snugly to the flange on the burner, substantially as and for the purpose specified.

2. In a lamp, the combination, with the reservoir A, provided with the described jacket D, and the burner C, with its perforated wall $c'$, surmounted by the flange $c^3$, having the concentric grooves $c^4$ in its upper exposed face, of the perforated sleeve E, carried by said jacket and surrounding said burner, and provided with the top flange, $e^2$, adapted to fit snugly to the flange on the burner, and having the concentric grooves $e^3$ in its upper exposed face, substantially as and for the purpose set forth.

JAMES W. WILLIAMS.

Witnesses:
A. S. FITCH,
A. T. FALES.